United States Patent

Sasaki

[11] Patent Number: 5,690,471
[45] Date of Patent: Nov. 25, 1997

[54] WATER PUMP

[75] Inventor: Norio Sasaki, Aichi-ken, Japan

[73] Assignees: Aisin Seiki K.K.; Toyota Jidosha K.K., both of Aichi-ken, Japan

[21] Appl. No.: 720,148

[22] Filed: Sep. 25, 1996

[30] Foreign Application Priority Data

Sep. 29, 1995 [JP] Japan ................ 7-253848

[51] Int. Cl.⁶ .................................................. F01D 25/00
[52] U.S. Cl. .................. 415/229; 415/230; 277/58
[58] Field of Search ........................ 415/170.1, 229, 415/230; 277/58, 152

[56] References Cited

U.S. PATENT DOCUMENTS

| 3,981,610 | 9/1976 | Ernst et al. ................. 415/230 |
| 4,770,424 | 9/1988 | Otto ............................. 277/53 |
| 4,943,068 | 7/1990 | Hatch et al. ................. 277/58 |
| 5,026,253 | 6/1991 | Borger ......................... 415/229 |
| 5,055,015 | 10/1991 | Furukawa .................... 277/58 |
| 5,137,285 | 8/1992 | Pick ............................. 277/58 |
| 5,169,286 | 12/1992 | Yamada ....................... 415/170.1 |

FOREIGN PATENT DOCUMENTS

| 3405513 | 4/1985 | Germany ..................... 277/58 |
| 3838902 | 5/1990 | Germany ..................... 277/230 |
| 4208628 | 9/1993 | Germany ..................... 277/58 |
| 63-57394 | 4/1988 | Japan . |

Primary Examiner—John T. Kwon
Attorney, Agent, or Firm—Hazel & Thomas

[57] ABSTRACT

A water pump includes a shaft to which an impeller has been attached, and a water pump housing in which the shaft is freely rotatably supported by a plain bearing. An annular mandrel having a lip seal fixedly secured to its distal end is inserted into an annular groove provided in the pump housing, thereby limiting the axial movement of the shaft.

5 Claims, 2 Drawing Sheets

WATER PUMP

BACKGROUND OF THE INVENTION

This invention relates to a water pump used in a water cooled system of an internal combustion engine for automotive vehicles.

A example of the prior art to which the present invention appertains is disclosed in Japanese Utility Model Laid-Open Publication No. Sho 63-57394(1988). A water pump disclosed in this example of the prior art includes a water pump housing, a shaft freely rotatably supported in the housing by bearings, and an impeller, which rotates within the pump chamber, attached to one end of the shaft. A mechanical seal is interposed between the impeller and the bearings holding the shaft, thereby allowing rotation between the shaft and the water pump housing forming the pump chamber while maintaining a liquid-tight seal which assures that the fluid within the pump chamber will not leak from the chamber.

In this conventional arrangement, however, the cost of the mechanical seal is high and the mechanical seal is structurally complex, thus making it difficult to reduce the size and weight of the water pump. In terms of the structure of the mechanical seal, a spring is provided to bias the sliding part of the seal. If the force of this spring is too large, abnormal noise is produced when the water pump operates. If the biasing force is too small, however, the water-tightness of the sliding part is compromised and the fluid will leak from the pump chamber. It is difficult to set a spring force that makes it possible to achieve both the water-tightness of the sliding part and the prevention of abnormal noises. Problems in terms durability also are quite likely to occur.

SUMMARY OF THE INVENTION

Accordingly, an object of the present invention is to provide a water pump which does not use a mechanical seal, thus making it possible to lower cost, reduce weight, prevent abnormal noise and prevent leakage of fluid.

According to the present invention, the foregoing object is attained by providing a water pump comprising a water pump housing forming a pump chamber, a shaft having one end provided with rotating force transmitting means and another end on which an impeller is fitted, the shaft being freely rotatably supported in the water pump housing via a plain bearing, an annular mandrel attached to the shaft on the outer periphery thereof between a portion of the shaft supported by the plain bearing and the rotating force transmitting means, the mandrel having a distal end that is inserted into an annular groove formed in the opposing water pump housing, and a comparatively large-diameter annular lip seal attached to the distal end of the annular mandrel, the lip seal having a width substantially the same as that of the annular groove.

The water pump having the above-described construction is such that the shaft is freely rotatably supported by the plain bearing placed in the water pump housing on the pump chamber side thereof. In addition, the plain bearing is capable of being lubricated by the fluid within the pump chamber. The large-diameter lip seal attached to the annular mandrel integrated with the shaft is fitted into the annular groove provided in the water pump housing between the portion where the shaft is supported by the plain bearing and the rotating force transmitting means (the side opposite the pump chamber). This makes it possible to prevent leakage of fluid from the pump chamber. The lip seal also serves as a thrust bearing that limits the free movement of the shaft in the axial direction.

In an embodiment of the invention, comparatively small-diameter annular lip seals for providing a seal between the shaft and the water pump housing are disposed on both sides of the annular mandrel axially of the shaft, and grease is sealed between the small-diameter annular lip seals.

By sealing grease between the small-diameter annular lip seals, it is possible to lubricate the sliding portions between the large-diameter lip seal, which rotates together with the shaft, and the side wall of the annular grove provided in the water pump housing, as well as the sliding portions between the small-diameter lip seals and the shaft.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the accompanying drawings.

Figure 1:
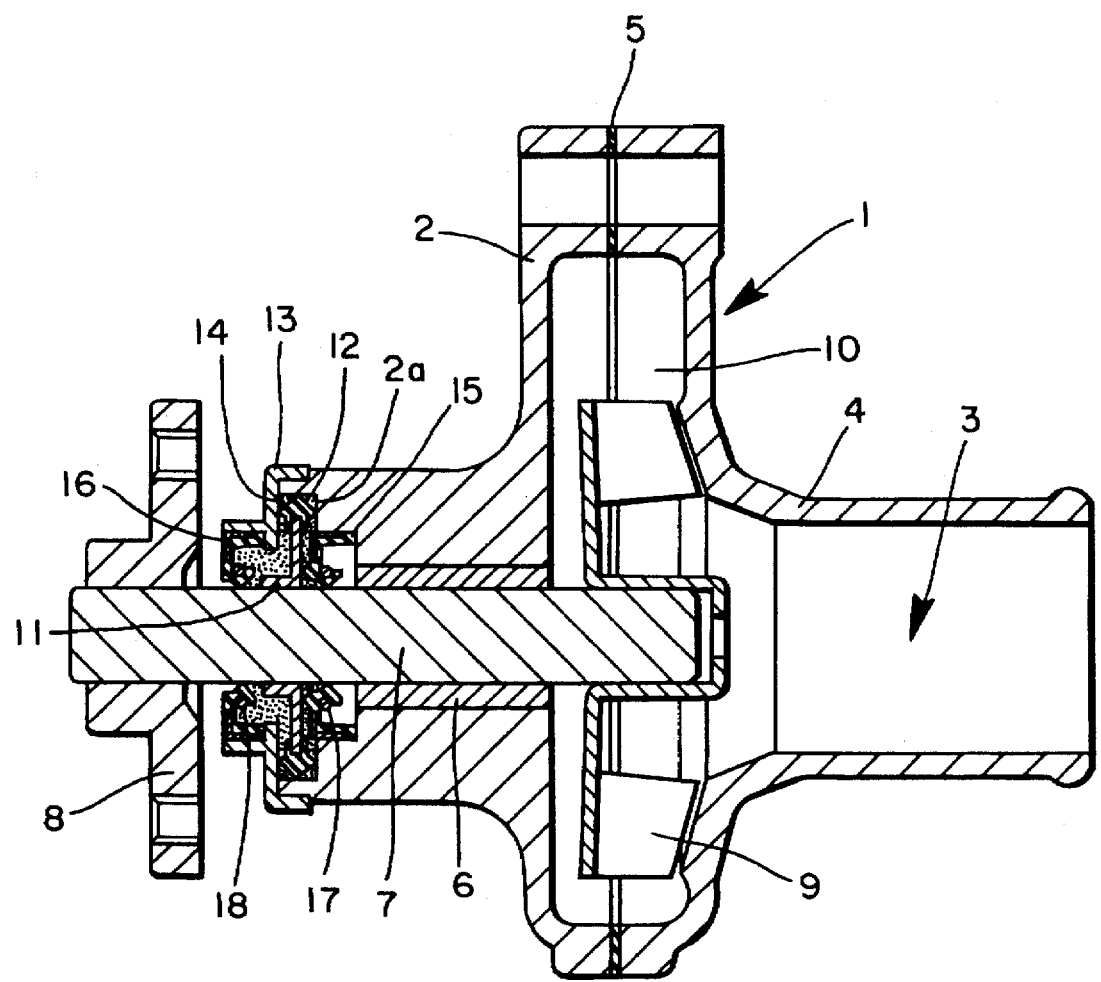
FIG. 1 is a partial sectional view illustrating a water pump according to an embodiment of the present invention.

FIG. 1 is a sectional view of a water pump 1 embodying the present invention. The water pump 1 includes a water pump housing 2 consisting of a metal such as aluminum, and a suction cover 4 having an intake port 3. The water pump housing 2 and the suction cover 4 are joined via a gasket 5 to form the housing of the water pump 1. A water-lubricated plain bearing 6 is press-fitted into the inner peripheral portion of the water pump housing 2 and holds a shaft 7 in a freely rotatable manner. The plain bearing 6 is obtained by sinter-forming bronze on the surface of an SPCC material and coating the exterior surface with a resin containing a lead mixture or the like. The shaft 7 is rotated under a driving force provided by a drive unit (not shown) via a belt (not shown) stretched about the outer circumference of a pulley (not shown) mounted on a pulley bracket 8. An impeller 9, which is fixedly secured to the right end of the shaft 7, rotates along with the shaft.

A pump chamber 10 is formed between the water pump housing 2 and suction cover 4. The impeller 9 rotates inside the pump chamber 10 and impels the fluid within the chamber. An annular mandrel 11, which has a generally L-shaped cross section, is fixedly secured to the outer periphery of the shaft 7 at a point between the plain bearing 6 and pulley bracket 8. An annular lip seal (a large-diameter lip seal) 12 having a generally rhomboidal cross section is attached to the distal end of the annular mandrel 11. The annular lip seal 12, which consists of a comparatively hard poly-tetra-fluoro-ethylene resin, is sealed in an annular groove 14 defined by a step portion 2a of the water pump housing 2 and a cover member 13 attached to the end face of the water pump housing 2, as illustrated in the enlarged view of FIG. 2. Apices 12a, 12b and 12c of the rhomboidal cross section of the annular lip seal 12 make contact with the side walls and bottom wall forming the annular groove 14.

Figure 2:
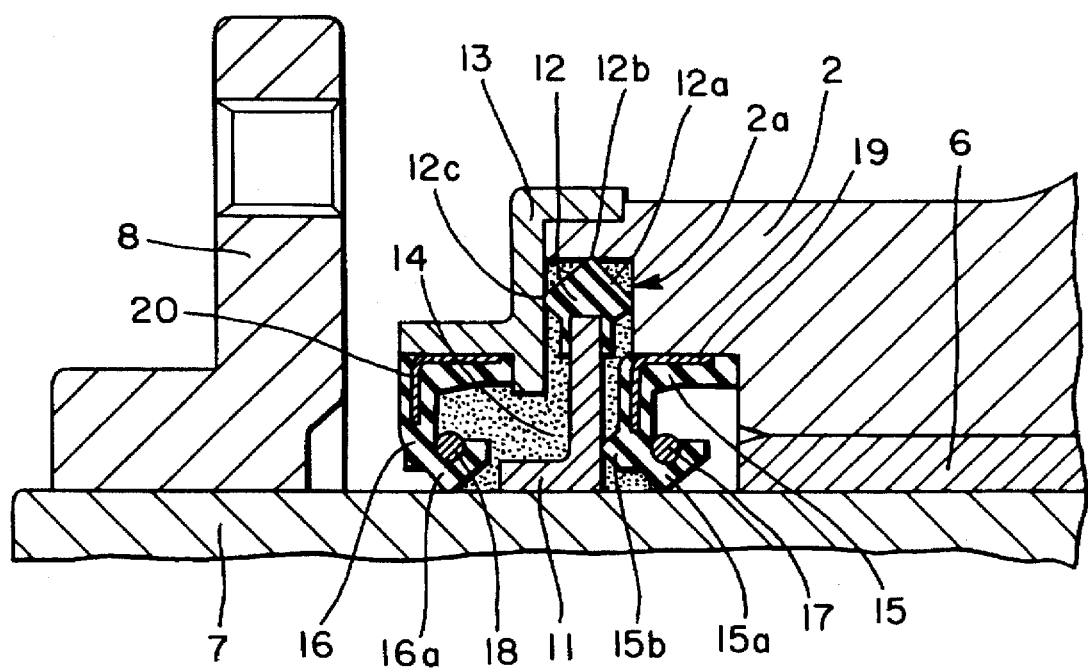
FIG. 2 is a partial enlarged view of the water pump according to the first embodiment.

Freedom of the shaft 7 to move in the axial direction is limited owing to the fact that the apices 12a, 12c of the rhomboidal cross section of the annular lip seal 12 are in contact with the side walls of the annular groove 14. Annular lip seals (small-diameter lip seals) 15, 16 consisting of a rubber material such as N-NBR or EPDM, etc., are provided on respective sides of the annular mandrel 11 axially of the shaft 7 and are attached to the water pump housing 2 in order to effect sealing between the shaft 7 and the water pump housing 2. Garter springs 17, 18 are disposed within the annular lip seals 15, 16, respectively, which have sliding portions 15a, 16a that slide on the shaft 7. The garter springs 17, 18 urge these sliding portions 15a, 16a, respectively, against the outer surface of the shaft 7, as shown in FIG. 2, thereby enhancing the seal between the water pump housing 2 and the shaft 7. Metal core members 19, 20 are embedded in the annular seals 15, 16, respectively, in order to reinforce the same. The annular seal 15 has a projection 15b in abutting contact with the annular mandrel 11. The space between the annular lip seals 15 and 16 is filled with grease. The apices 12a, 12b, 12c of the annular lip seal 12 are lubricated by the grease when they slide in the annular groove 14. The grease lubricates the sliding portions 15a, 15b of the annular lip seal 15 and the sliding portion 16a of the annular lip seal 16 as well.

In the operation of the water pump 1, the fluid drawn from the intake port 3 of suction cover 4 is impelled in the pump chamber 10 owing to rotation of the impeller 9 rotated within the chamber 10 by the rotating shaft 7. The impelled fluid is discharged from a discharge hole (not shown) provided in the water pump housing 2 or suction cover 4 and extending tangentially with respect to rotation of the impeller 9. Some of the fluid in the pump chamber 10 flows into the space between the plain bearing 6 and the shaft 7 in the water pump housing 2, thereby lubricating the bearing 6 and the shaft 7. The fluid that has lubricated the bearing 6 and shaft 7 is prevented from flowing leftward in FIGS. 1 and 2 by the sliding portion 15a of the annular lip seal 15. Even if the fluid should happen to pass the sliding portion 15a of the annular lip seal 15, the fluid in the pump chamber 10 can be prevented from leaking to the outside by the projection 15b on the annular lip seal 15 contacting the annular mandrel 11 and the apices 12a, 12b, 12c on the rhomboidal cross section of the annular lip seal 12 contacting the annular groove 14.

Thus, in accordance with the water pump according to the present invention, the shaft 7 of the water pump housing 2 is supported by the plain bearing 6, the annular mandrel 11 to which the lip seal 15 is attached is integrated with the shaft 7, the annular mandrel 11 is inserted into the annular groove 14 provided in the water pump housing 2 and the free movement of the shaft 7 in the axial direction is limited. As a result, mechanical seals and ball bearings are not required. This makes it possible to provide a light-weight, inexpensive and structurally simple water pump that is simple to assemble.

Further, in accordance with the present invention, the lip seals 15, 16 are provided on both sides of the annular mandrel 11 axially of the shaft and the space between these lip seals is filled with grease. This reduces the sliding resistance between the annular groove 14 and the lip seal 12 attached to the annular mandrel 11 and makes it possible to prevent the fluid from leaking out of the pump chamber 10.

As many apparently widely different embodiments of the present invention can be made without departing from the spirit and scope thereof, it is to be understood that the invention is not limited to the specific embodiments thereof except as defined in the appended claims.

What is claimed is:

1. A water pump comprising:

a water pump housing defining a pump chamber;

a shaft having one end provided with rotating force transmitting means and another end on which an impeller is fitted, said shaft being freely rotatably supported in said water pump housing via a plain bearing;

an annular mandrel attached on the outer periphery of said shaft between a portion of said shaft supported by said plain bearing and said rotating force transmitting means, said mandrel having a distal end that is inserted into an annular groove formed in said water pump housing at a position opposite to the side surface of said water pump housing;

a first annular lip seal attached to the distal end of said annular mandrel, said first annular lip seal having portions which make contact with walls forming said annular groove; and second annular lip seals for providing a seal between said shaft and said water pump housing disposed on both sides of said annular mandrel axially of said shaft, and grease is filled in a space between said second annular lip seals.

2. The water pump according to claim 1, wherein said first annular lip seal has a diameter larger than diameters of said second annular lip seals.

3. The water pump according to claim 1, wherein each of said second annular lip seals includes:

an embedded member for reinforcing said second annular lip sea; and means for urging said second annular lip seal against the outer periphery of said shaft.

4. The water pump according to claim 2, wherein said first annular lip seal has generally rhombodidal cross section of which apices are brought into seal contact with the walls forming said annular groove.

5. The water pump according to claim 4, wherein a cover member for defining said annular groove is secured to said water pump housing and one of said second annular lip seals is secured to said cover member.

* * * * *